E. LEHR.
ELECTRIC RELAY.
APPLICATION FILED JUNE 30, 1916.

1,326,355.

Patented Dec. 30, 1919.
2 SHEETS—SHEET 2.

WITNESSES:

INVENTOR
Edwin Lehr.
BY
ATTORNEY

UNITED STATES PATENT OFFICE.

EDWIN LEHR, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC RELAY.

1,326,355.      Specification of Letters Patent.      Patented Dec. 30, 1919.

Application filed June 30, 1916. Serial No. 106,753.

*To all whom it may concern:*

Be it known that I, EDWIN LEHR, a citizen of the United States, and a resident of Pittsburgh, in the county of Allegheny and State of Pennsylvania, have invented a new and useful Improvement in Electric Relays, of which the following is a specification.

My invention relates to electric relays and especially to such as are employed in connection with devices utilized for regulating the voltage, or any other electrical quantity, of an alternating-current circuit.

More particularly, my invention relates to contact-making voltmeters which embody electromagnetic protective devices for protecting the associated alternating-current circuits from abnormal rises of potential under certain conditions.

In a motor-driven feeder regulator of the induction type, the operation of the motor is controlled by means of a special form of relay commonly designated as a contact-making voltmeter. The variations in the voltage on the circuit with which the regulator is associated cause the voltmeter to close the one or the other of two motor circuits and thereby so excite the motor as to move the induction regulator in the one or the other direction in order to restore the voltage to the desired or normal value. If the energizing circuit of the voltmeter relay becomes broken or if the voltage of the regulated circuit is temporarily interrupted or falls below a predetermined value, the voltmeter relay will so act as to cause the induction regulator to move to that position which will cause a maximum increase in the voltage impressed upon the circuit by the regulator. When normal voltage is again established, it is instantly boosted by the regulator as much as possible, since the regulator occupies its maximum boosting position. Before the voltmeter and motor can operate to move the regulator into its maximum lowering position to effect a reduction in the voltage impressed upon the alternating-current circuit, considerable damage may result.

The object of my invention, therefore, is to provide a contact-making voltmeter that will automatically operate to cause the regulator to move to its maximum lowering position in case of a temporary interruption of the voltage upon the regulated circuit or a decrease in the voltage below a predetermined value. On the resumption of normal conditions, the contact-making voltmeter of the present invention will automatically perform its usual functions.

Figure 1:
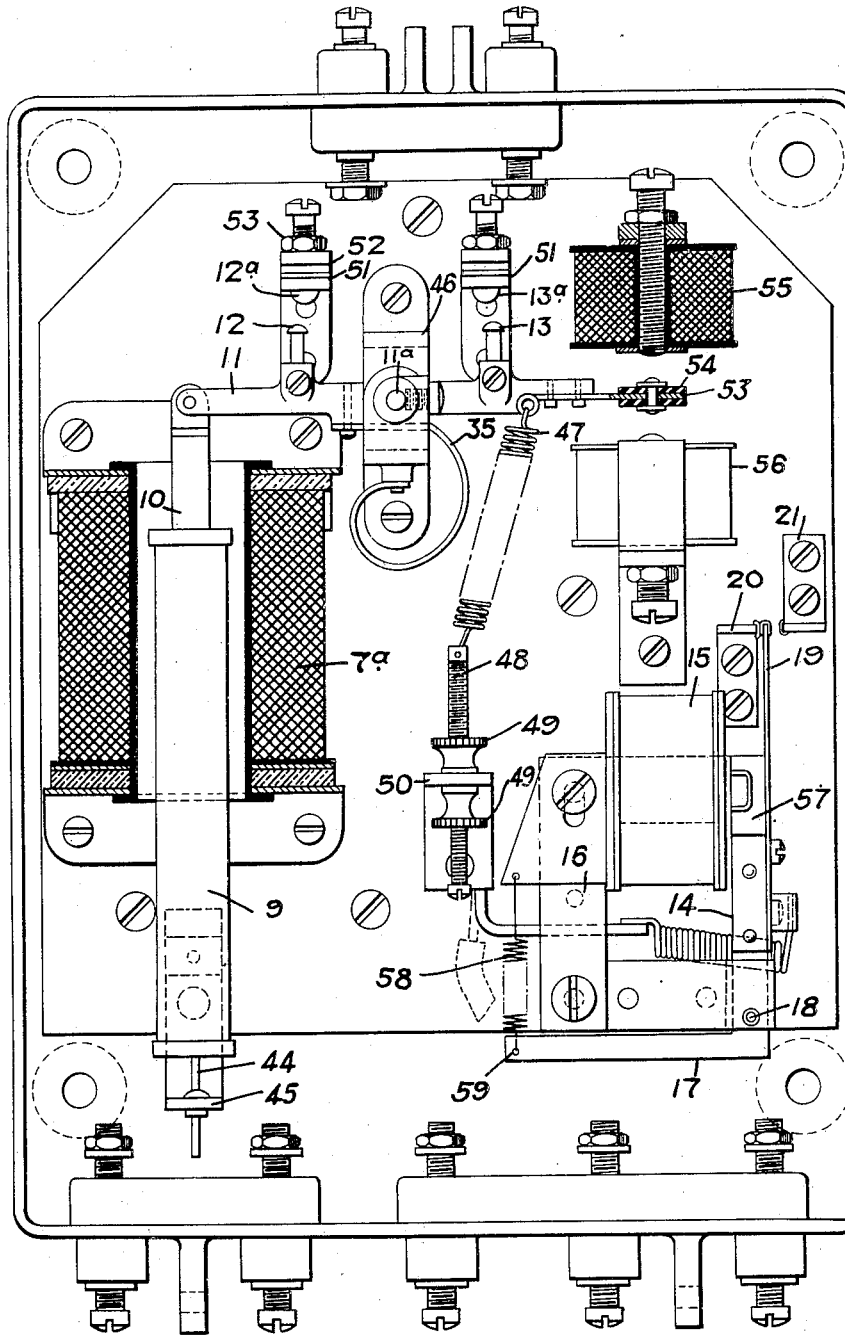
Figures 2, 3:
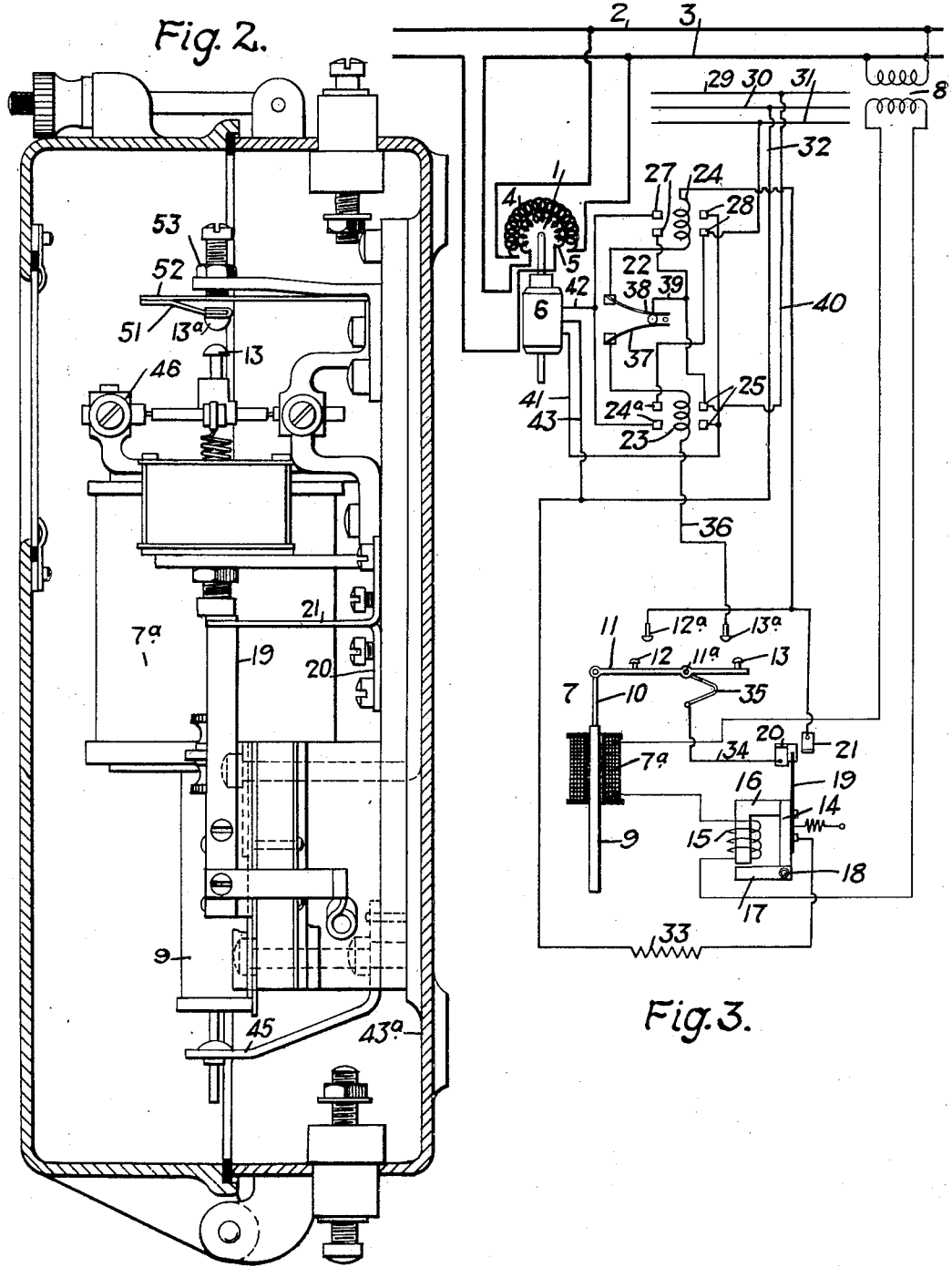

For a better understanding of the nature and scope of my invention, reference may be had to the following description and the accompanying drawings in which Figure 1 is a view, in front elevation, of a device constructed in accordance with my invention; Fig. 2 is a side and sectional view of the device shown in Fig. 1, and Fig. 3 is a diagram illustrating the method of connecting my contact-making voltmeter in circuit with an induction regulator and a feeder circuit that is associated therewith.

While the present device may be adapted to other uses, it is particularly useful, and is here shown as being employed, in connection with a regulator 1 of the induction type which controls or regulates the voltage of a single-phase alternating-current circuit comprising conductors 2 and 3. The regulator comprises relatively movable primary and secondary windings 4 and 5, the movable winding 5 being wound upon a suitable core member (not shown) which, in turn, is actuated by a motor 6. A relay or contact-making voltmeter 7 controls the operation of the motor 6, in accordance with the variations of the voltage of the circuit 2—3, for the purpose of causing the regulator 1 to maintain the voltage of said circuit substantially constant. To this end, the relay 7 comprises a main-actuating coil or solenoid $7^a$ that is connected in circuit with, and energized by, a voltage transformer 8. The degree of the energization of the solenoid $7^a$ varies according to the voltage impressed upon the circuit 2—3, since the primary winding of the voltage transformer 8 is connected across said circuit. The solenoid $7^a$ is provided with a movable core member 9 that is suspended by means of a rod 10, from the end of a lever 11 which is fulcrumed at $11^a$. Upon the lever 11, are mounted two contact members 12 and 13 which are adapted to engage contact members $12^a$ and $13^a$, respectively, according to the position of the lever 11. An electromagnet 14 is provided with an energizing winding 15 that is connected in series-circuit relationship with the solenoid $7^a$. The winding 15 embraces a leg of a core member 16, of which a right-angled shaped armature 17, pivoted at 18, forms a part. Upon the armature 17, is mounted a resilient contact member 19 that is adapted to engage either a contact member 20 or a contact member 21, as will be hereinafter described.

Inserted in circuit between the contact-making volt-meter 7 and the induction regulator 1 is an electromagnetic switching device 22 which comprises energizing coils 23 and 24, the energizing coil 23 being excited by means of the contact-making voltmeter 7 to effect engagement between pairs of contact members 24$^a$ and 25, and the energizing coil 24 being also excited by means of the contact-making voltmeter 7 to effect engagement between pairs of contact members 27 and 28. When the winding 23 is energized and the contact members 24$^a$ and the contact members 25 are in engagement, the motor 6 will rotate in such direction as to move the regulator 1 to a position in which it will boost or raise the voltage impressed upon the feeder circuit 2—3 to its normal value. Similarly, when the energizing winding 24 is excited and the pairs of contact members 27 and 28 are in engagement, the motor 6 will so rotate as to move the regulator 1 into its lowering position. The relay device 22 is shown diagrammatically only, because it forms no part of my present invention but I have illustrated it, however, in order to assist in understanding the operation of my relay device 7.

The switching device 22 is claimed and fully described in my co-pending application, Serial No. 50,090, filed September 10, 1915.

A three-phase supply circuit, comprising conductors 29, 30 and 31, furnishes power to the motor 6, the interconnections between said motor and the supply circuit being effected by means of the contact-making voltmeter 7 and the switching device 22. To illustrate the operation of my relay device, assume that the contact members 13 and 13$^a$ of the contact-making voltmeter 7 are brought into engagement by reason of a decrease in the voltage on the feeder circuit 2—3. A circuit is thereby established comprising the supply lead 30, a conductor 32, a resistor 33, the resilient contact member 19 of the electromagnet 14, the contact member 20, a conductor 34, a spring member 35, the lever 11, the contact members 13 and 13$^a$, a conductor 36, the energizing winding 23 of the reversing switch 22, contact members 37 and 38, conductors 39 and 40 and the supply lead 29 of the three-phase supply circuit. The energizing winding 23, being thus excited, brings into engagement the contact members 24$^a$ and the contact members 25, which, in turn, excite the motor 6 in such direction as to cause the regulator 1 to move to its boosting position to restore the normal voltage upon the feeder circuit.

At the same time, a terminal 41 of the motor 6 is connected to the supply main 29, and a terminal 42 of the motor is connected to the supply main 31, the terminal 43 of the motor being permanently connected to the supply main 30. When the energizing winding 24 of the reversing switch 22 is energized by reason of the engagement of the contact members 12 and 12$^a$ of the contact making voltmeter 7, which engagement occurs when the voltage upon the feeder 2—3 exceeds its normal value, the terminals 41 and 42 of the motor 6 are automatically reversed, thereby causing the motor to so operate the induction regulator as to move it to its lowering position.

From the foregoing, it will be apparent that the contact-making voltmeter 7 selectively energizes the motor 6 to actuate the movable element of the regulator in the proper direction for restoring normal voltage upon the feeder circuit 2—3.

The aforementioned operation of the relay 7 continues only so long as the voltage upon the feeder circuit 2—3 does not vary beyond a predetermined limit. When the voltage is discontinued or falls below a predetermined value, which value will be incapable of being compensated for by the induction regulator, it is necessary to move the regulator to its maximum lowering position so that, when normal voltage conditions are restored upon the feeder circuit, the regulator will not impress an unduly high voltage upon the feeder circuit.

If the energizing circuit comprising the solenoid 7$^a$ is broken or if the voltage of the feeder is temporarily interrupted or decreases below a predetermined value, the electromagnetic device 14 will be sufficiently deënergized to permit the armature 17 to move to its open position. As a result, the resilient contact member 19 engages the contact member 21 which establishes circuit connections through the reversing switches 22 that are equivalent to those obtaining when the feeder voltage is greater than normal and the contact members 12 and 12$^a$ are in engagement. When the resilient member 19 engages the contact member 21, the energizing coil 24 of the reversing switch 22 is energized sufficiently to effect engagement between the contact members 27 and the contact members 28. In consequence thereof, the motor 6 moves the regulator to its maximum lowering position so that, when normal voltage is again supplied to the feeder circuit, the regulator will not be in such position as to impress its maximum voltage thereupon.

It will be noted that, in this manner, the contact-making voltmeter 7 prevents the regulator from moving to its maximum boosting position when the voltage upon the feeder is discontinued or falls below a certain predetermined value. The ordinary fluctuations in the feeder voltage, however, are compensated for by the regulator, the movements of which are controlled by the contact-making voltmeter 7 operating in its normal manner. Harmful increases of voltage upon the feeder circuit are thus precluded by the automatic operation of the auxiliary electromagnetic device 14, which is effected without any attention from an operator.

Referring specially to Figs. 1 and 2, the electromagnet 7$^a$ and the device 14 are mounted in a common casing 43$^a$. The core 9 of the solenoid 7$^a$ is guided in its movement by means of a rod 44 that extends downwardly from the lower end of the core and passes through an aperture in a bracket 45. The upper end of the plunger 9 is pivotally connected to the lever arm 11 which, in turn, is fulcrumed in a bracket 46. The contact members 12 and 13 are mounted substantially as shown upon the upper face of the lever 11. One end of the lever 11 is engaged by a helical spring 47, the other end of which is attached to one end of a screw 48, whereby the tension of the spring 47 may be adjusted. A screw 48 is provided with adjustable nuts 49 that are located upon opposite sides of a stationary bracket 50, whereby the adjustment of the spring 47 may be effected and the parts locked in position after adjustment. The tension of the spring 47 is so adjusted as to almost balance the weight of the core 9 in order that, when the voltage impressed upon the solenoid 7$^a$ increases, the contact members 12 and 12$^a$ will effect engagement, and when it decreases the contact members 13 and 13$^a$ will effect engagement. The contact members 12$^a$ and 13$^a$ are carried by short springs 51, which, in turn, are mounted on the free ends of springs 52, the other ends of which are attached to stationary brackets 53.

The end of the lever 11 opposite to the point of attachment of the rod 10 is provided with a resiliently mounted magnetizable extension 53 which carries insulating disks or plates 54 at its free end, the said extension constituting an armature for two electromagnets 55 and 56 that are disposed, respectively, upon opposite sides of the lever arm, as shown. The insulating disks 54 prevent grounding of the contact terminals mounted upon the lever arm 11. Windings of the electromagnets 55 and 56 are energized respectively when the contact members 13$^a$ and 12$^a$ are energized by the actuation of the lever arm 11 and they serve as holding-in coils to insure a firm engagement between the contact members 12 and 12$^a$ and the contact members 13 and 13$^a$. The holding-in coils 55 and 56, with their attendant structure, are old in the art and, consequently, will not be described in detail.

The electromagnetic device 14 is mounted in the casing 43$^a$, as hereinbefore mentioned. The pivoted armature 17 is so positioned that the resilient extension 19 thereof may engage either the contact member 20 or the contact member 21, depending upon the energization of the coil 15. The coil 15 is mounted upon the one core leg of the magnetizable member 16 and the flux generated thereby exerts a pull upon the upper portion 57 of the core leg. A tensional spring member 58 having one of its ends connected to a free end 59 of the armature 17 tends to maintain the armature 17 in its open position, but, since the coil 15 is normally energized, the force exerted by the tensional member 58 is overcome and the contact members 19 and 20 are thus normally engaged. When, however, the magnetization of the coil 15 is sufficiently decreased, the spring member 58 moves the armature 17 to its open position and thereby establishes contact between the resilient member 19 and the contact member 21.

While I have shown, in detail, only one embodiment of my invention, it will be understood that many modifications may be made therein without departing from the spirit and scope of the appended claims.

I claim as my invention:

1. In a contact-making voltmeter, the combination with an electromagnet having a core that operates a contact member, of a second electromagnet having its winding connected in series with said first electromagnet and serving to establish a circuit for reversing the action of the said contact member when deënergized below a predetermined value.

2. In a contact-making instrument, the combination with an electromagnet having a movable core, and a contact member controlled thereby when said electromagnet is subjected to normal excitation, of a second electromagnet serving to establish a circuit for reversing the normal action of said contact member when the energization of said first electromagnet falls below a predetermined value.

3. In a contact-making voltmeter, the combination with an electromagnet having a movable core, a contact member controlled thereby only when normal operating conditions obtain, of a second electromagnet having a winding connected in series with the winding of the first electromagnet, said second electromagnet serving to establish a circuit for reversing the action of the contact member when the energization of the electromagnets fall below a predetermined value.

4. In a contact-making voltmeter, the combination with an electromagnet and a contact member controlled thereby which completes a controlling circuit when in a forward and in a reverse position, of a second electromagnet having a winding connected in series with the winding of the first electromagnet which subjects said contact member to the influences of said first electromagnet under operating conditions but which serves to eliminate the control of the contact member by said first electromagnet when the energization of said electromagnets decreases below a predetermined value.

5. The combination with a circuit to be regulated, an induction regulator associated therewith and a motor for adjusting the position of the movable member thereof, of a contact-making voltmeter having one electromagnet that normally controls the direction of rotation of said motor and a second electromagnet having a winding in series with the winding of the first electromagnet for reversing the normal rotation of the motor when the voltage of said circuit varies beyond a predetermined limit.

6. The combination with a circuit to be regulated, an induction regulator associated therewith and a motor for adjusting the position of the movable member thereof, of a contact-making voltmeter having one electromagnet that normally controls the direction of rotation of said motor and a second electromagnet having a winding connected in series with the winding of the first electromagnet for discontinuing the action of said first electromagnet on said motor when the voltage on the regulated circuit varies beyond a predetermined limit.

In testimony whereof, I have hereunto subscribed my name this 29th day of June, 1916.

EDWIN LEHR.